(12) United States Patent
Mohammed-Fakir et al.

(10) Patent No.: US 6,764,081 B2
(45) Date of Patent: Jul. 20, 2004

(54) SUPPLEMENTAL SEAL FOR THE CHORDAL HINGE SEALS IN A GAS TURBINE AND METHODS OF INSTALLATION

(75) Inventors: Abdul-Azeez Mohammed-Fakir, Schenectady, NY (US); Mahmut Faruk Aksit, Istanbul (TR); Ahmad Safi, Troy, NY (US); Srikanth Vedantam, Niskayuna, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 10/028,932

(22) Filed: Dec. 28, 2001

(65) Prior Publication Data

US 2003/0122309 A1 Jul. 3, 2003

(51) Int. Cl.⁷ .............................. F16J 15/02; F01D 9/04
(52) U.S. Cl. ...................... 277/637; 277/652; 277/647
(58) Field of Search ................................ 277/637, 642, 277/641, 647, 652; 415/191, 209.2

(56) References Cited

U.S. PATENT DOCUMENTS

| | | | |
|---|---|---|---|
| 4,184,689 A | | 1/1980 | Brodell et al. |
| 4,199,151 A | * | 4/1980 | Bartos ........................ 277/306 |
| 4,212,472 A | * | 7/1980 | Mizuno et al. ................ 165/9 |
| 4,438,939 A | * | 3/1984 | Pask et al. ................... 277/644 |
| 4,575,099 A | * | 3/1986 | Nash ........................... 277/345 |
| 4,589,666 A | * | 5/1986 | Halling ....................... 277/631 |
| 4,815,933 A | | 3/1989 | Hansel et al. |
| 5,078,412 A | * | 1/1992 | Baumgarth .................. 277/345 |
| 5,118,120 A | * | 6/1992 | Drerup et al. .............. 277/628 |
| 5,149,250 A | | 9/1992 | Plemmons et al. |
| 5,158,305 A | * | 10/1992 | Halling ....................... 277/591 |
| 5,271,714 A | | 12/1993 | Shepherd et al. |
| 5,372,476 A | | 12/1994 | Hemmelgarn et al. |
| 5,645,398 A | * | 7/1997 | Benoist et al. .............. 415/134 |
| 5,716,052 A | * | 2/1998 | Swensen et al. ............ 277/647 |
| 5,839,878 A | * | 11/1998 | Maier ....................... 415/209.2 |
| 6,095,750 A | | 8/2000 | Ross et al. |
| 6,568,903 B1 | * | 5/2003 | Aksit et al. ................. 415/191 |
| 6,595,745 B1 | * | 7/2003 | Mohammed-Fakir et al. .... 415/191 |
| 2003/0122311 A1 | * | 7/2003 | Aksit et al. ................. 277/312 |

* cited by examiner

Primary Examiner—Alison K. Pickard
(74) Attorney, Agent, or Firm—Nixon & Vanderhye (57) ABSTRACT

In a gas turbine, a supplemental seal is provided between an annular axially facing sealing surface of a nozzle support ring and an annular axially opposed sealing surface formed by circumferentially adjacent nozzle segments. Each segment carries an inner rail mounting a chordal hinge seal which engages the sealing surface of the nozzle support ring. That seal is supplemented by a generally arcuate V-shaped seal between the sealing surfaces which opens radially inwardly toward a high pressure leakage path past the chordal hinge seal. The supplemental seal is initially compressed and maintained in a compressed condition during installation by application of a solder. At operating temperature, the solder melts away, releasing the supplemental seal to seal between the nozzle support ring and nozzle segments.

18 Claims, 7 Drawing Sheets

SUPPLEMENTAL SEAL FOR THE CHORDAL HINGE SEALS IN A GAS TURBINE AND METHODS OF INSTALLATION

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals and which is readily and easily installed without reconfiguration of the first-stage nozzles or nozzle support ring. The supplemental seal comprises a generally V-shaped seal for disposition between the axially facing first surface of the nozzle support ring and an axially facing second surface of a turbine nozzle segment. Particularly, the nozzle segment includes a radially inwardly projecting inner rail mounting the chordal seal which engages the first surface of the nozzle support ring. The inner rail also has a shallow recess radially outwardly of the projection forming the chordal hinge seal. The supplemental seal is disposed between the first and second axially registering surfaces for sealing engagement therebetween.

More particularly, the supplemental seal extends arcuately between the first and second sealing surfaces and includes a stem enabling the supplemental seal to be secured to the sealing surface of the inner rail, for example, by bolting. The V-shaped portion of the supplemental seal faces inwardly and in operation, a free edge of the V-shaped seal bears against the first sealing surface. The opposite edge is joined to an edge of the stem and forms a sealing surface with the second annular surface. Thus, the V-shape opens radially inwardly in registration with the high pressure region in the event of leakage past the chordal hinge seal. Any high pressure leakage flexes or biases the seal into engagement to seal between the opposite first and second annular surfaces. The circumferential extent of the supplemental seal is preferably coincident with the circumferential extent of the nozzle segment.

A feature of the present invention resides in initially compressing and maintaining the seal compressed in a substantially arcuate planar form prior to assembly and upon initial assembly, into the machine. To accomplish this, the legs of the V-shaped seal are compressed against the stem and a material, preferably a solder, is applied to maintain the V-shaped seal in a compressed condition. The soldered compressed seal forms essentially a solid block or seal piece which facilitates handling, avoids exposed sharp edges and affords a sturdiness and robustness to the seal during handling and installation. The supplemental seal is installed by bolting in its compressed condition to the second annular surface along the shallow recess of the inner rail. When the turbine is brought up to operating conditions, e.g., when the turbine temperature exceeds that of the melting temperature of the solder, the solder melts away, releasing the V-shaped portion of the seal from its compressed state into an expanded state and into engagement with the opposite first and second sealing surfaces of the nozzle support ring and the inner rail, respectively.

In a preferred embodiment according to the present invention, there is provided a turbine comprising a turbine nozzle support ring having a generally axially facing first surface, a turbine nozzle segment having at least one stator vane and including an inner band having a second surface in axial opposition to the first surface, a flexible seal between the first and second surfaces including a seal body between high and low pressure regions on opposite sides of the seal, the seal body including first and second portions in opposition to one another and coupled to one another along adjoining edges thereof, opposite edges of the first and second portions being spaced from one another defining an opening into a cavity in the seal body between the first and second portions, the first and second portions being preloaded to bear against the first and second surfaces, respectively, with the cavity opening toward the high pressure region.

In a further preferred embodiment according to the present invention, there is provided a gas turbine comprising a turbine nozzle support ring having a generally axially facing first surface, a turbine nozzle segment having at least one stator vane and including an inner band having a second surface in axial opposition to the first surface, a flexible seal between the first and second surfaces including a seal body between high and low pressure regions on opposite sides of the seal, the seal body including first and second portions in opposition to one another and coupled to one another along adjoining edges thereof, the seal body including a stem extending from the second seal portion and bearing against one of the first and second surfaces, an overlay of material along at least the first and second portions and at least portions of the stem maintaining the first and second portions in a state of compression generally against the stem portion, the material being releasable from the portions to enable the first and second portions to resiliently move away from one another and from the stem to engage a distal edge of the first portion against another of the first and second surfaces, respectively.

In a further preferred embodiment according to the present invention, there is provided a method of forming a seal in a gas turbine having a nozzle support ring including a first axially facing sealing surface and an annular array of nozzles formed of a plurality of nozzle segments each having an inner band and a second, generally axially facing sealing surface in general axial opposition to the first surface comprising the steps of providing a flexible seal having first and second portions in opposition to one another and connected to one another along adjoining edges thereof, compressing the first and second portions toward one another to form a compressed seal, securing the compressed seal to one of the first and second surfaces and between the surfaces and releasing the first and second portions of the compressed seal to enable a distal edge of the first portion remote from the adjoining edges to engage another of the first and second surfaces.

DETAILED DESCRIPTION OF THE INVENTION

Figure 1:
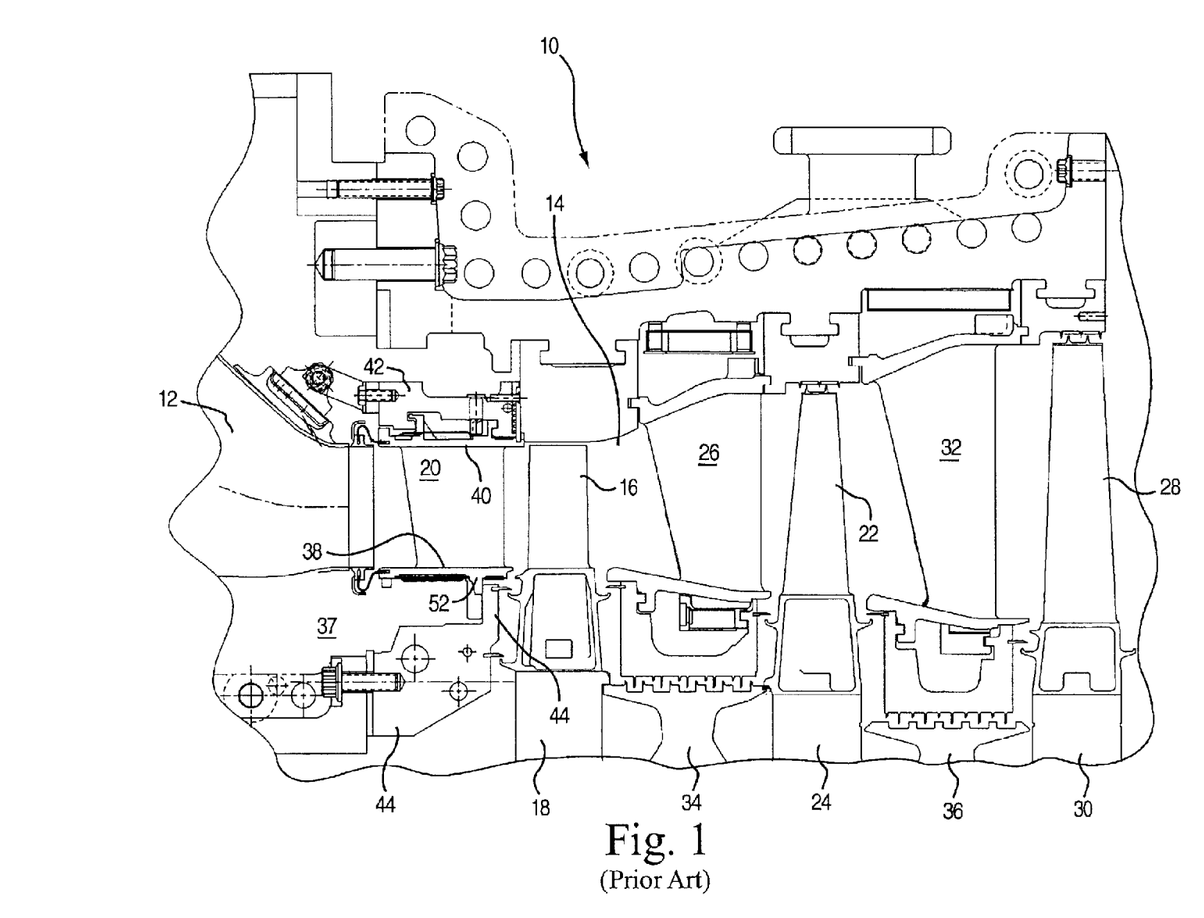
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
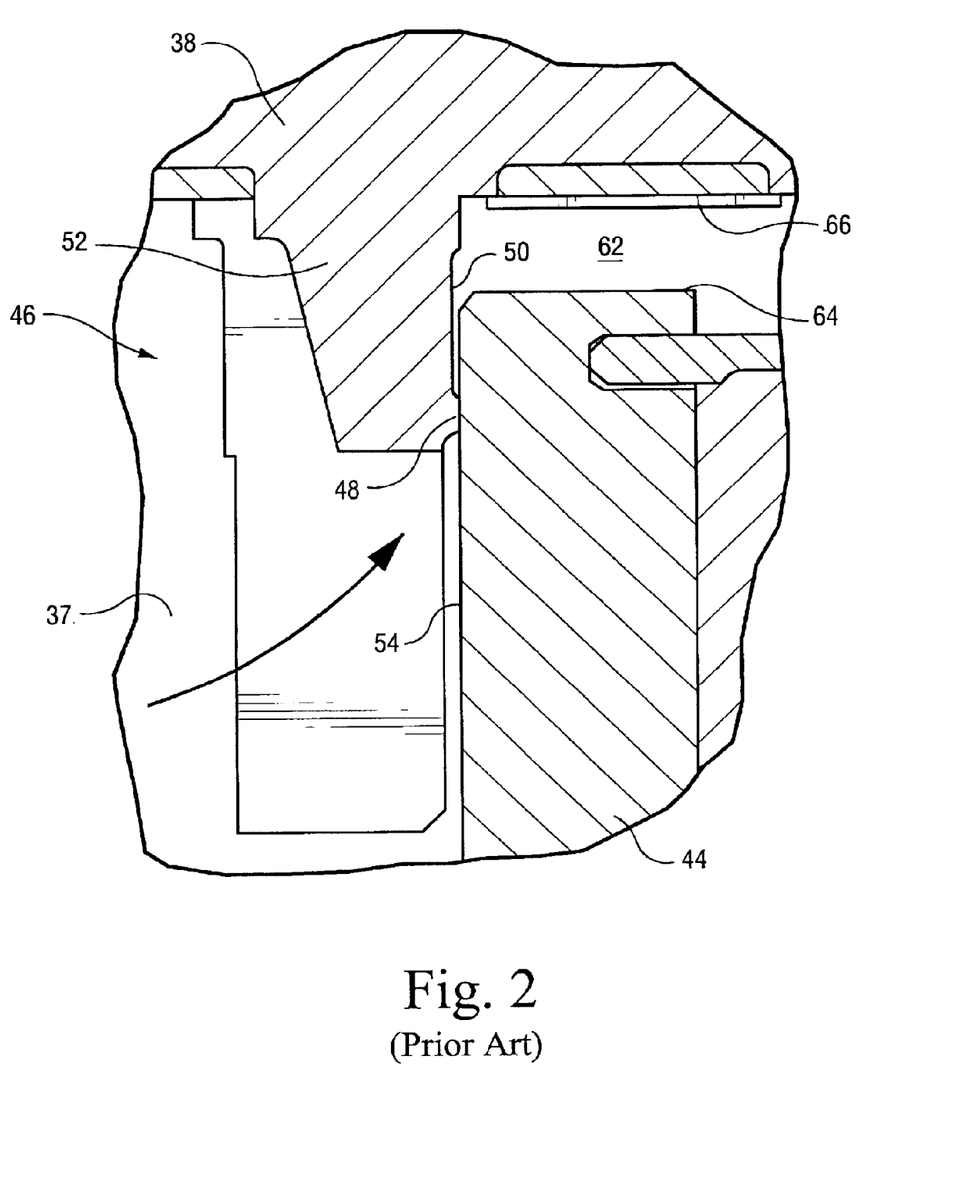
FIG. 2 is an enlarged fragmentary cross-sectional view illustrating a conventional chordal seal hinge.
Figure 3:
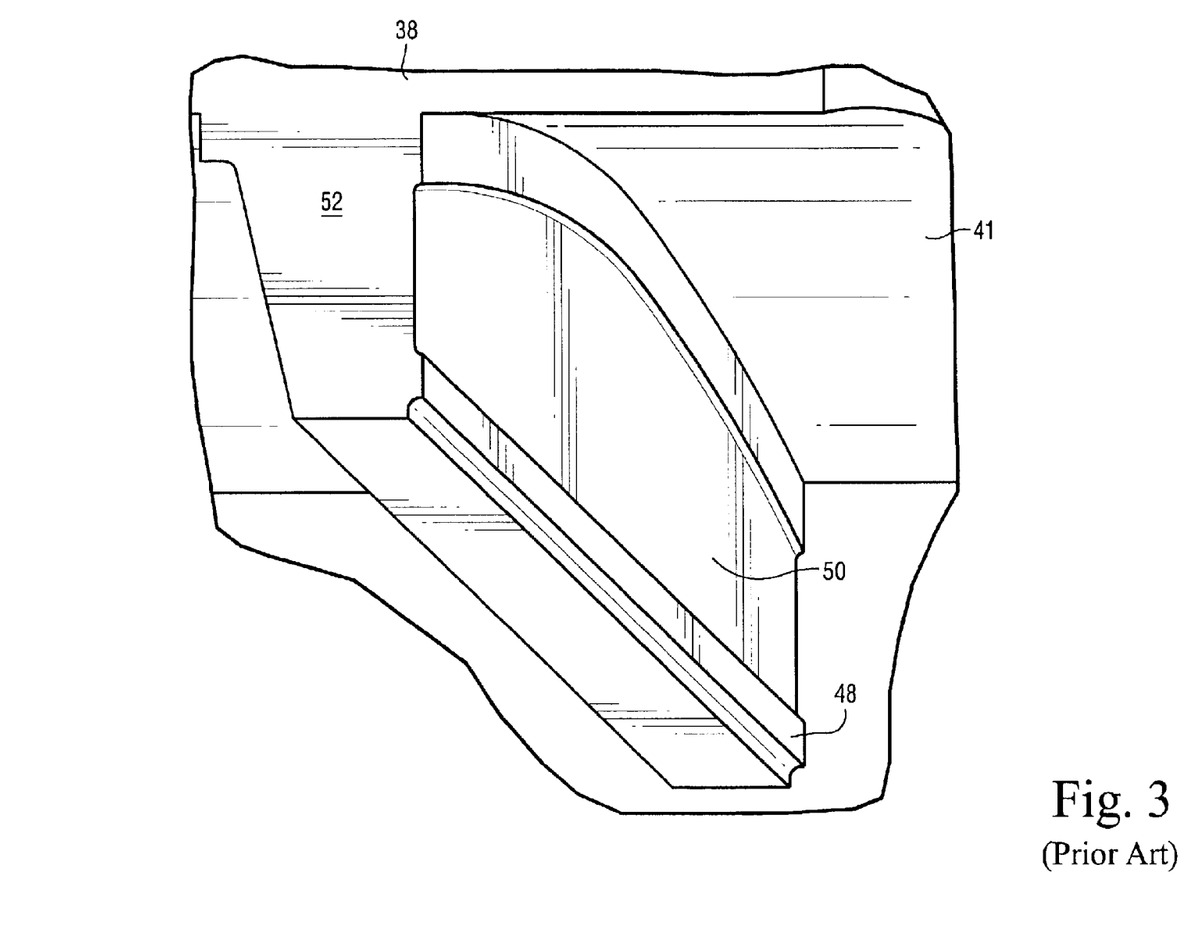
FIG. 3 is a fragmentary perspective view illustrating a portion of a conventional chordal hinge seal along an inner rail of a nozzle segment.
Figure 4:
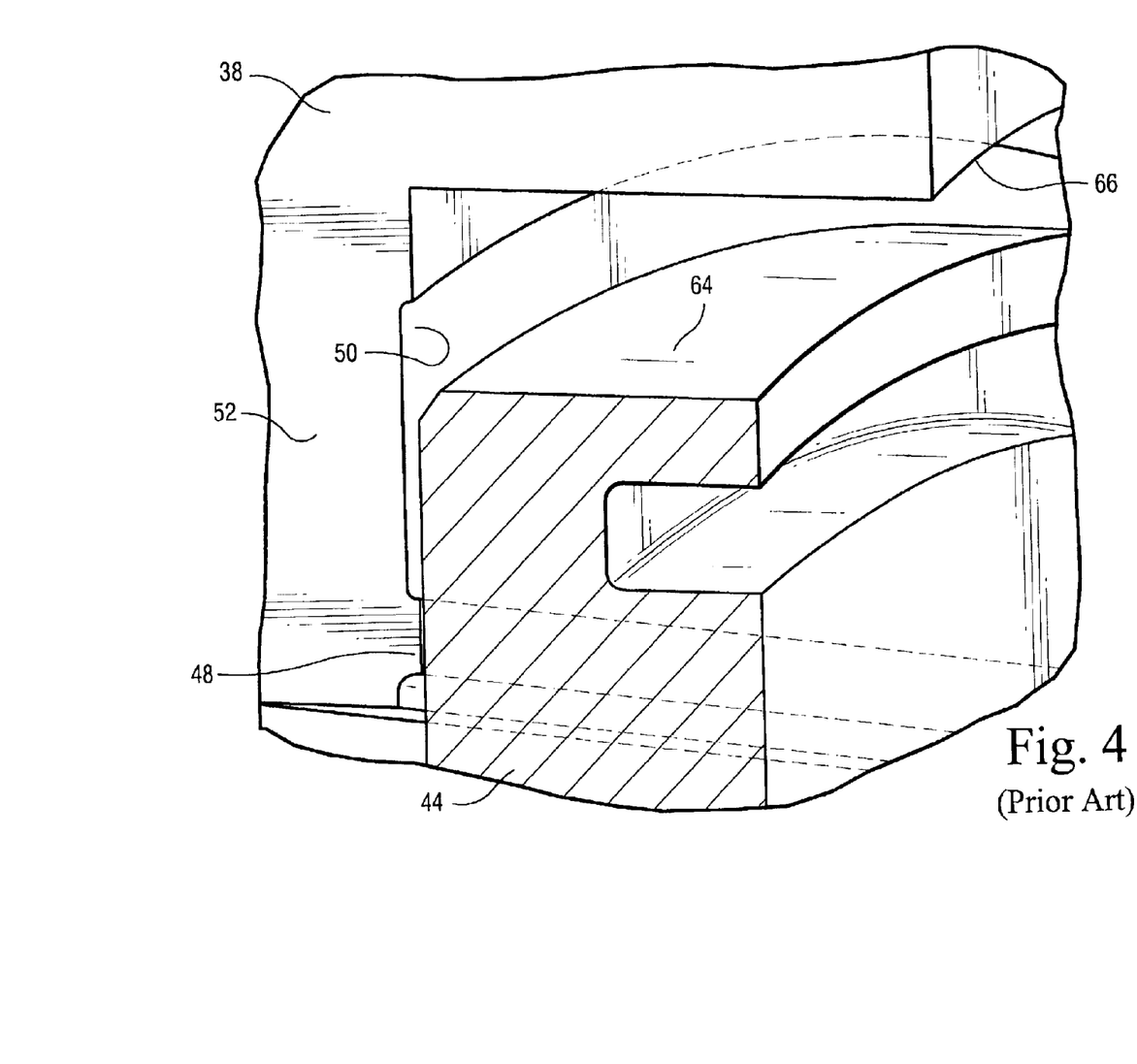
FIG. 4 is a fragmentary perspective view with parts in cross-section illustrating the conventional chordal hinge seal in sealing engagement with a nozzle support ring of the gas turbine.
Figure 5:
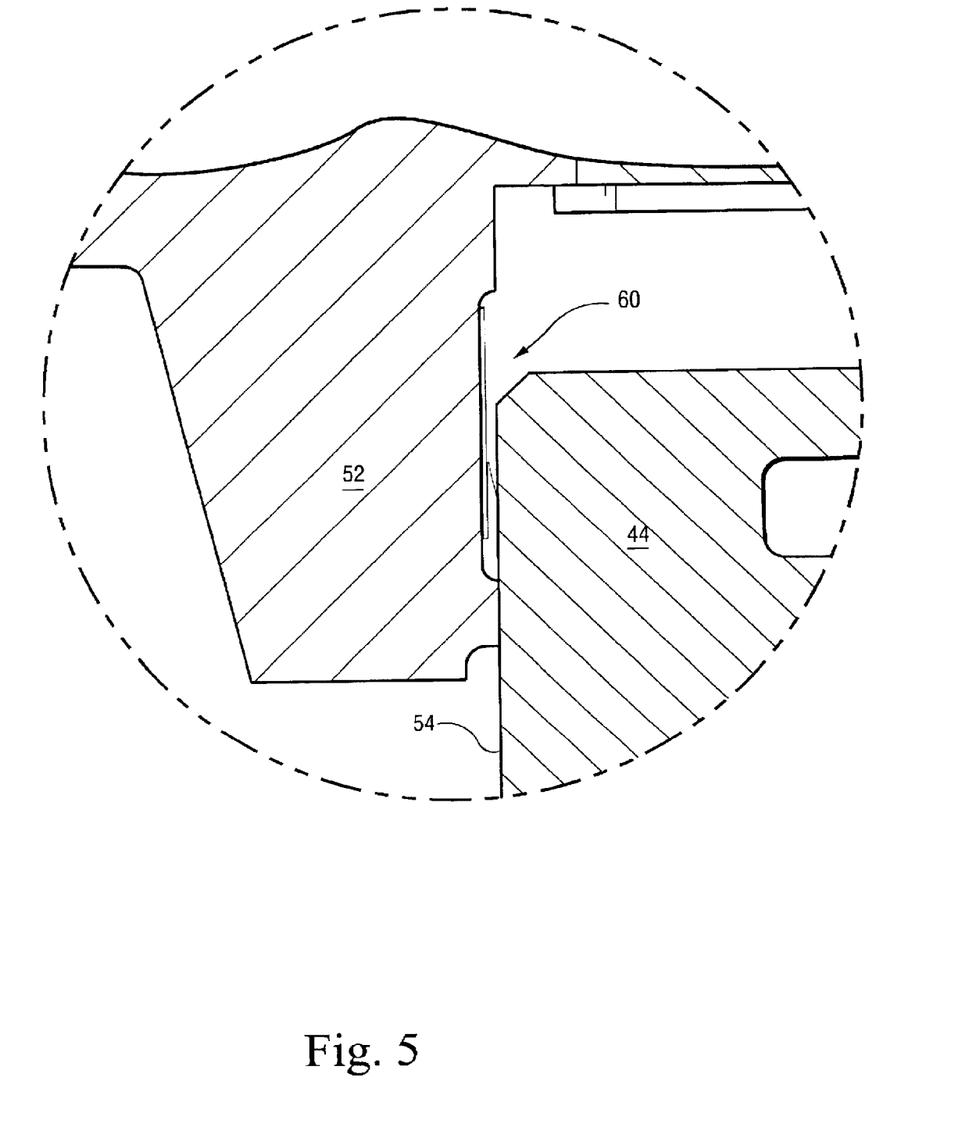
FIG. 5 is an enlarged cross-sectional view of a supplemental seal disposed between sealing surfaces of the annular support ring and the inner rail.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 thus is intended to seal against leakage from the high pressure region 37 into the lower pressure region of the hot gas path 14.

Figure 6:
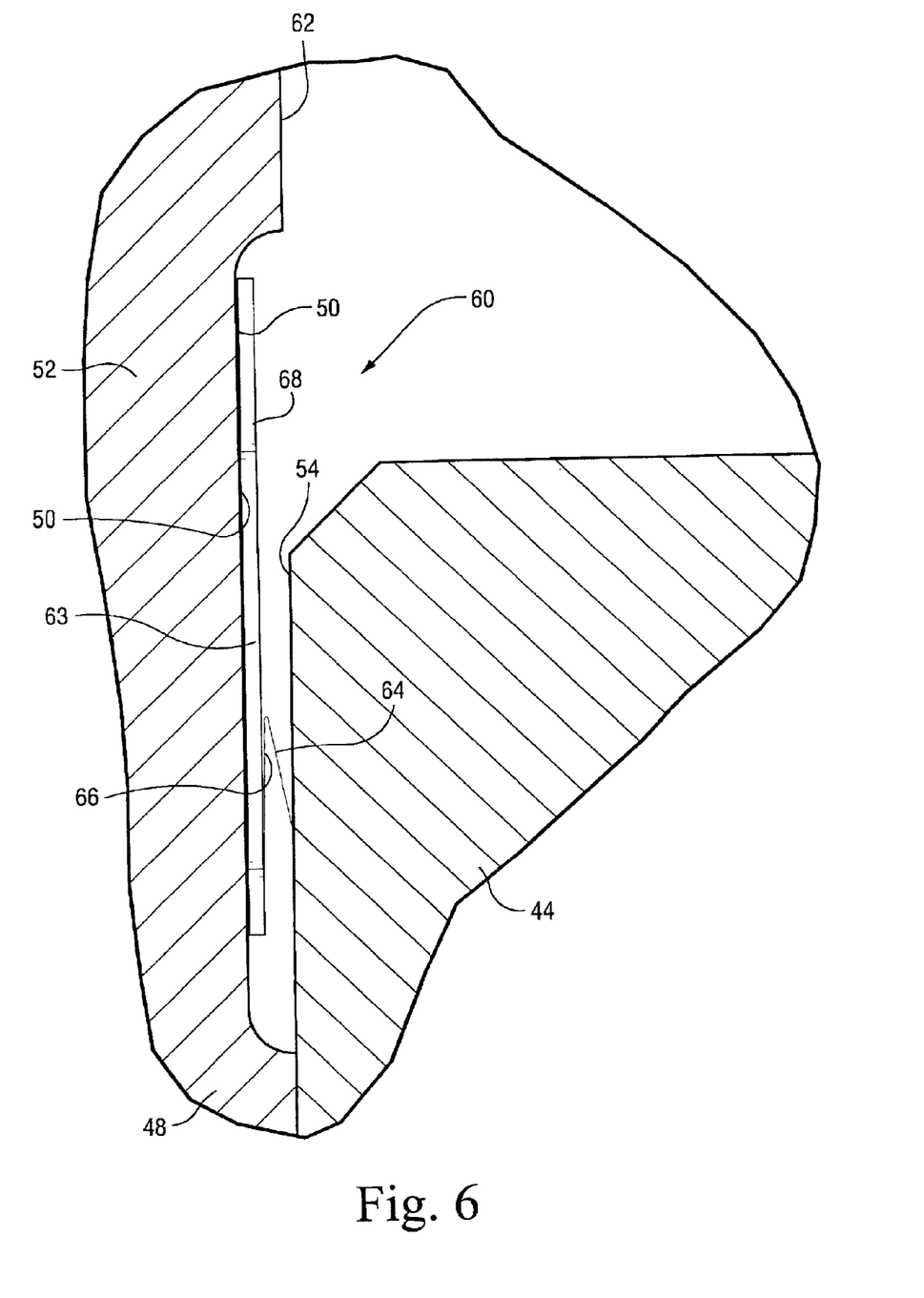
FIG. 6 is an enlarged cross-sectional view of the supplemental seal.

As noted previously, however, in operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 60, is disposed between the first sealing surface 54 of the nozzle support ring 44 and the second sealing surface 50 of the inner rail 52 of the inner band 38. As illustrated in FIG. 6, the sealing surface 50 comprises a shallow recess along the axially facing surface 62 of the inner rail 52. The supplemental seal 60 is arcuate and has a circumferential extent corresponding to the circumferential extent of the inner rail 52 of the nozzle segment.

Supplemental flexible seal 60 includes a seal body 63 having first and second arcuate sheet metal portions 64 and 66, respectively, folded over one another to form a generally V-shaped configuration opening radially inwardly upon installation in the turbine. As illustrated in FIG. 6, the distal or free edge 65 of the first seal portion 64 bears against the first annular sealing surface 54 of the nozzle support ring 44. The second portion 66 of the generally V-shaped supplemental seal 60 terminates along its edge bearing against the second annular sealing surface 50 of the inner rail 52. The edge of the second portion 66 is also connected to a stem 68. The stem is formed of a sheet material thicker than the material forming the V-shaped first and second portions 64 and 66, respectively, of the supplemental seal 60. The seal 60 is preferably formed of sheet metal. The stem 68 includes a number of openings 69 whereby the stem can be secured to the surface 50 of the inner rail 52, for example, by bolts. The supplemental seal extends arcuately from edge to edge of each segment and is secured to locate the V-shaped first and second portions 64 and 66, respectively, between the sealing surfaces 54 and 50. It will be appreciated that with the seal installed as illustrated, the V-shaped seal body opens toward the chordal hinge seal and is thus exposed to the high pressure in region 36 in the event of leakage past the chordal hinge seal. The high pressure leakage flow maintains the portions 64 and 66 of the V-shaped seal in engagement against the opposed sealing surfaces.

Figure 7:
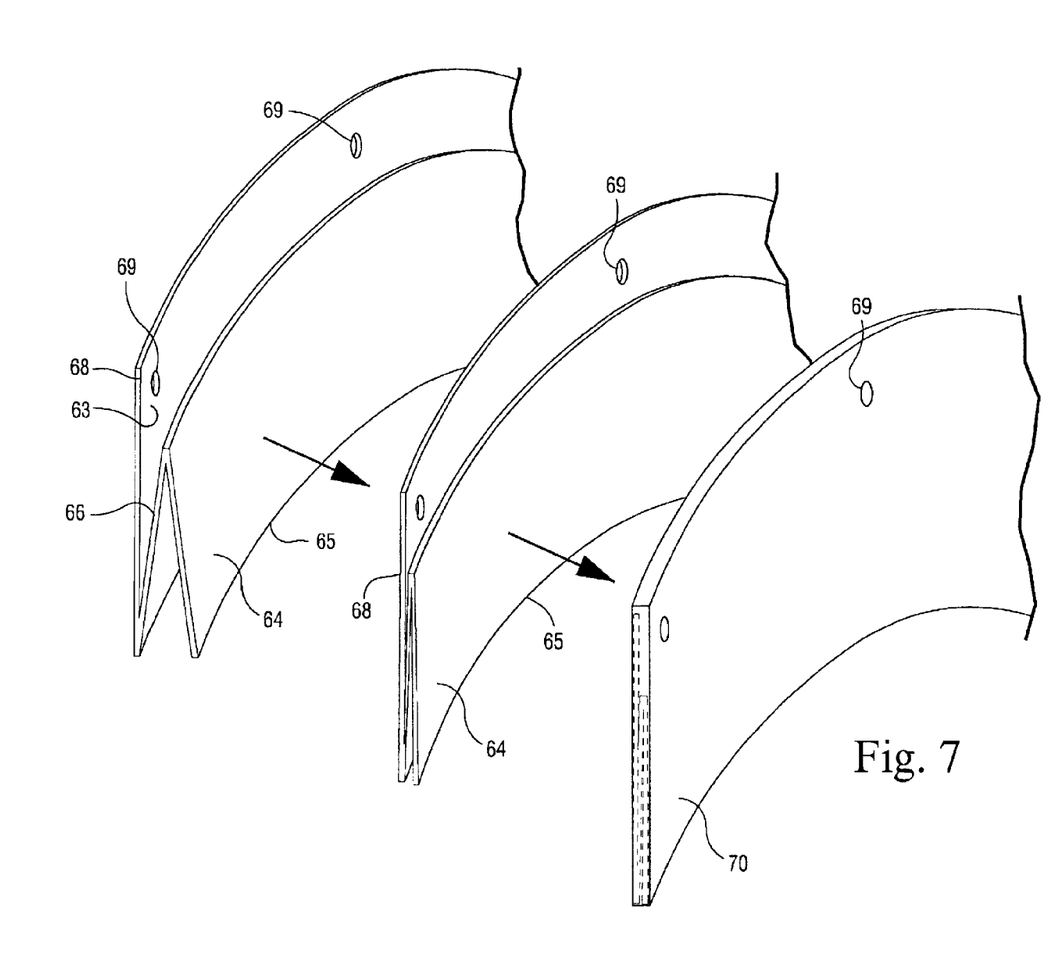
FIG. 7 is a fragmentary perspective view illustrating schematically the compression of the supplemental seal and its retention in a compressed state prior to and during installation.

To facilitate handling and installation of each supplemental seal, the V-shaped portion of the seal body 63 including the stem 68 is compressed, as illustrated in FIG. 7. While maintaining the seal in a state of compression, the seal is coated with a solder 70 that maintains the seal body 63 in a solid monolithic state. The thick coating of solder 70 on the supplemental seal 60 enables safe handling of the seal during installation, eliminates any sharp edges along the seal by embedding such edges within the solder material and renders the seal sturdy and robust during handling and installation. After the supplemental seal is secured, e.g., by bolting, to the inner rail 52 with the compressed portions 64 and 66 disposed between sealing surfaces 54 and 50, the solder, at machine operating conditions, i.e., high temperatures, melts away, releasing the seal from its monolithic compressed state. This enables the portions 64 and 66 to expand away from one another into engagement with the surfaces 54 and 50, respectively. It will be appreciated that the seal body is preloaded and thus the portions 64 and 66 expand toward their natural unbiased positions. An alternative material for maintaining the supplemental seal in a compressed condition comprises wax.

It will also be appreciated that the supplemental seal, instead of being formed in circumferential lengths corresponding to the circumferential length of each nozzle segment along its inner rail, may be formed in greater arcuate lengths. In that manner, the supplemental seals may overlap the side seals between adjacent nozzle segments, in effect providing supplemental seals for the side seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
   a turbine nozzle support ring having a generally axially facing first surface;
   a turbine nozzle segment having at least one stator vane and including an inner band having a second surface in axial opposition to said first surface;
   a flexible seal between said first and second surfaces including a seal body between high and low pressure regions on opposite sides of the seal, said seal body including first and second portions in opposition to one another and coupled to one another along adjoining edges thereof;
   opposite edges of said first and second portions being spaced from one another defining an opening into a cavity in the seal body between said first and second portions, said first and second portions being preloaded to bear against the first and second surfaces, respectively, with said cavity opening toward the high pressure region;
   said first and second portions being initially compressed relative to one another such that at least one of said opposite edges is spaced from one of said first and second surfaces and means for releasably retaining said first and second portions in a state of compression with said one opposite edge spaced from said one of said first and second surfaces, said means enabling release of said compressed portions in response to turbine operating conditions.

2. A turbine according to claim 1 wherein said seal is in the form of an arcuate segment.

3. A turbine according to claim 1 wherein said seal body includes a stem extending from one of said edges bearing against one of the first and second surfaces and extending along said one surface, said stem being secured to said one surface.

4. A turbine according to claim 1 wherein said nozzle segment includes a generally radially inwardly extending inner rail having a generally axially extending projection engageable with said first surface to form a second seal therewith.

5. A turbine according to claim 4 wherein said projection extends in a chord-wise direction relative to an axis of the turbine rotor.

6. A turbine comprising:
   a turbine nozzle support ring having a generally axially facing first surface;
   a turbine nozzle segment having at least one stator vane and including an inner band having a second surface in axial opposition to said first surface;
   a flexible seal between said first and second surfaces including a seal body between high and low pressure regions on opposite sides of the seal, said seal body including first and second portions in opposition to one another and coupled to one another along adjoining edges thereof;
   opposite edges of said first and second portions being spaced from one another defining an opening into a cavity in the seal body between said first and second portions, said first and second portions being preloaded to bear against the first and second surfaces, respectively, with said cavity opening toward the high pressure region;
   wherein said first and second portions are initially compressed relative to one another such that at least one of said opposite edges is spaced from one of said first and second surfaces and means for maintaining said first and second portions in a state of compression; and wherein said means includes a solder applied to said first and second portions and releasable in response to turbine operating temperatures to enable the first and second portions for displacement from their compressed state to their preloaded state with the edges engageable against the first and second surfaces, respectively, to form a seal therebetween.

7. A gas turbine comprising:

a turbine nozzle support ring having a generally axially facing first surface;

a turbine nozzle segment having at least one stator vane and including an inner band having a second surface in axial opposition to said first surface;

a flexible seal between said first and second surfaces including a seal body between high and low pressure regions on opposite sides of the seal, said seal body including first and second portions in opposition to one another and coupled to one another along adjoining edges thereof;

said seal body including a stem extending from said second seal portion and bearing against one of said first and second surfaces, an overlay of material along at least said first and second portions and at least portions of said stem maintaining said first and second portions in a state of compression generally against said stem portion, said material being releasable from said portions to enable said first and second portions to resiliently move away from one another and from said stem to engage a distal edge of said first portion against another of said first and second surfaces, respectively.

8. A gas turbine according to claim 7 wherein said first and second portions define a cavity therebetween in the seal body opening into the high pressure region.

9. A gas turbine according to claim 7 wherein said material is releasable at turbine operating conditions to enable displacement of the first and second portions from their compressed state to sealingly engage the distal edge against said another of said first and second surfaces.

10. A gas turbine according to claim 9 wherein said stem is secured to said nozzle segment and one of said first and second portions has a free edge engageable against said first surface of said nozzle support ring.

11. A gas turbine according to claim 7 wherein said nozzle segment includes a generally radially inwardly extending inner rail having a generally axially extending projection engageable with said first surface to form a second seal therewith.

12. A gas turbine according to claim 11 wherein said projection extends in a chord-wise direction relative to an axis of the turbine rotor.

13. A gas turbine according to claim 7 wherein said stem is formed of sheet material having a thickness greater than the thickness of sheet material forming said first and second portions.

14. A gas turbine according to claim 7 wherein said seal is arcuate about the axes of the turbine.

15. A method of forming a seal in a gas turbine having a nozzle support ring including a first axially facing sealing surface and an annular array of nozzles formed of a plurality of nozzle segments each having an inner band and a second, generally axially facing sealing surface in general axial opposition to said first surface comprising the steps of:

providing a flexible seal having first and second portions in opposition to one another and connected to one another along adjoining edges thereof;

compressing the first and second portions toward one another to form a compressed seal; maintaining the compressed seal with a distal edge of said first portion remote from the adjoining edges spaced from another of said first and second surfaces;

securing the compressed seal to one of said first and second surfaces and between said surfaces; and releasing the first and second portions of the compressed seal to enable the distal edge to move toward and engage said another of said first and second surfaces in response to turbine operating conditions.

16. A method according to claim 15 including providing the seal with a stem secured to said second portion and securing said stem to said one of said first and second surfaces.

17. A method of forming a seal in a gas turbine having a nozzle support ring including a first axially facing sealing surface and an annular array of nozzles formed of a plurality of nozzle segments each having an inner band and a second, generally axially facing sealing surface in general axial opposition to said first surface comprising the steps of:

providing a flexible seal having first and second portions in opposition to one another and connected to one another along adjoining edges thereof;

compressing the first and second portions toward one another to form a compressed seal;

securing the compressed seal to one of said first and second surfaces and between said surfaces;

releasing the first and second portions of the compressed seal to enable a distal edge of said first portion remote from the adjoining edges to engage another of said first and second surfaces; and enveloping the first and second portions in a material maintaining the first and second portions under compression and enabling the material when disposed between said first and second surfaces for release of the first and second portions and displacement of the first portion for sealing engagement against said another of said first and second surfaces.

18. A method according to claim 17 including providing the seal with a stem secured to said second portion and securing said stem to said second surface, enveloping the first and second portions and a portion of said stem with a solder material which melts at turbine operating conditions.

* * * * *